(12) United States Patent
Breukelaar et al.

(10) Patent No.: US 6,914,999 B2
(45) Date of Patent: Jul. 5, 2005

(54) ELECTRO-OPTIC MODULATORS

(75) Inventors: Ian Gregory Breukelaar, Ottawa (CA); Philip Michael Wort, Kanata (CA); Serge Bidnyk, Ottawa (CA); Pierre Simon Joseph Berini, Ottawa (CA)

(73) Assignee: Spectalis Corp., Nepean (CA)

( * ) Notice: Subject to any disclaimer, the term of this patent is extended or adjusted under 35 U.S.C. 154(b) by 0 days.

(21) Appl. No.: 10/449,094

(22) Filed: Jun. 2, 2003

(65) Prior Publication Data

US 2003/0223668 A1 Dec. 4, 2003

(30) Foreign Application Priority Data

May 31, 2002 (CA) ............................................. 2388574

(51) Int. Cl.⁷ ............................................. G02F 1/035
(52) U.S. Cl. ....................................................... 382/20
(58) Field of Search ........................................... 385/20

(56) References Cited

U.S. PATENT DOCUMENTS

| 4,249,796 A | 2/1981 | Sincerbox et al. |
| 4,432,614 A | 2/1984 | McNeill et al. |
| 4,451,123 A | 5/1984 | McNeill et al. |
| 4,583,818 A | 4/1986 | Chen et al. |
| 4,915,482 A | 4/1990 | Collins et al. |
| 4,948,225 A | 8/1990 | Rider et al. |
| 4,971,426 A | 11/1990 | Schildkraut et al. |
| 5,067,788 A | 11/1991 | Jannson et al. |
| 5,075,796 A | 12/1991 | Schildkraut et al. |
| 5,155,617 A | 10/1992 | Solgaard et al. |
| 5,157,541 A | 10/1992 | Schildkraut et al. |
| 5,347,395 A | 9/1994 | Lautenschlager et al. |
| 5,485,277 A | 1/1996 | Foster |
| 5,583,643 A | 12/1996 | Gass et al. |
| 5,625,729 A | 4/1997 | Brown |
| 5,729,641 A | 3/1998 | Chandonnet et al. |
| 6,034,809 A | 3/2000 | Anemogiannis |
| 6,282,005 B1 * | 8/2001 | Thompson et al. ......... 398/143 |
| 6,442,231 B1 | 8/2002 | O'Hara |
| 6,504,651 B1 | 1/2003 | Takatori |
| 6,611,367 B1 * | 8/2003 | Naya et al. ................. 359/299 |
| 2003/0059147 A1 | 3/2003 | Berini |

FOREIGN PATENT DOCUMENTS

| CA | 2319949 | 3/2002 |
| EP | -0 324 611 A | 7/1989 |
| WO | WO 00 16140 A | 3/2000 |
| WO | WO 01/48521 | 7/2001 |
| WO | WO 02 08810 A | 1/2002 |
| WO | WO 03/001258 | 1/2003 |

OTHER PUBLICATIONS

Charbonneau R et al. "Long–Range Plasmon–Polariton Wave Propagation in Thin Metal Films of Finite–Width Excited Using an End–Fire Techique" Proceedings of the SPIE, SPIE vol. 4087, Jun. 12, 2000, pp 534–540 XP001029024 paragraph 03.2.

(Continued)

*Primary Examiner*—John R. Lee
*Assistant Examiner*—Phillip A Johnston
(74) *Attorney, Agent, or Firm*—Thomas Adams

(57) ABSTRACT

A low loss, low drive voltage plasmon-polariton electro-optic modulator based on mode cutoff comprises a waveguide structure formed by a thin metallic strip surrounded by material having a relatively low free charge carrier density. The metallic strip has finite width and thickness with dimensions such that optical radiation having a wavelength in a predetermined range couples to the metallic strip and propagates along the length of the metallic strip as a plasmon-polariton wave. The surrounding material comprises two distinct portions with the metallic strip extending between them. The modulator comprises means for varying an electric field applied to at least one portion so as to vary the value of the electromagnetic property and thereby the propagation characteristics of the plasmon-polariton wave.

41 Claims, 10 Drawing Sheets

OTHER PUBLICATIONS

Berini, P "Plasmon–Polariton Waves Guided byThin Lossy Metal of Finite Width : Bound Modes of Asymmetric Structures"Physical Review, B. Condensed Matter, American Institute of Physics. New York, US vol. 63, No. 12. Mar. 15, 2001 pp 125417–1–125417–15, XP002215459 ISSN: 0163–1829 p. 14.

Berini, Pierre, "The Proximity Effect of Conductors in Optical Waveguide Devices: Coupling to Plasmon–Politron Modes," SPIE vol. 4111, pp. 60–68, Jul. 2000.

Jaeger et al. "Voltage–Induced Optical Waveguide Modulator in Lithium Niobate," IEEE Journal of Quantum Electronics, vol. 25, No. 4, 1989, pp. 720–728.

Ashley et al. "Improved Mode Extinction Modulator Using a Ti–Indiffused LiNbO3 Channel Waveguide," Applied Physics Letters, vol. 45, No. 8, 1984, pp. 840–842.

Yariv and Yeh, "Optical Waves in Crystals," John Wiley & Sons, New York, 1984.

* cited by examiner

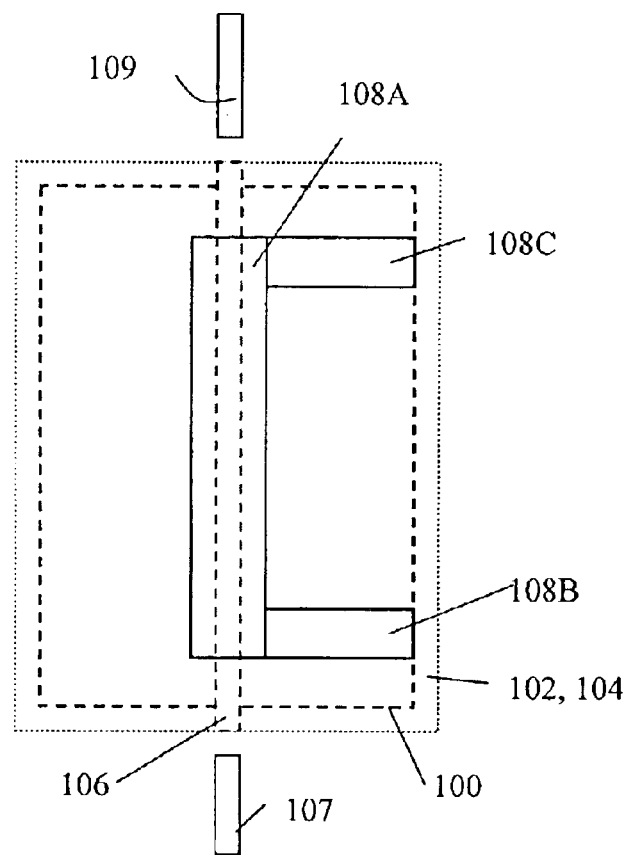
Fig. 2
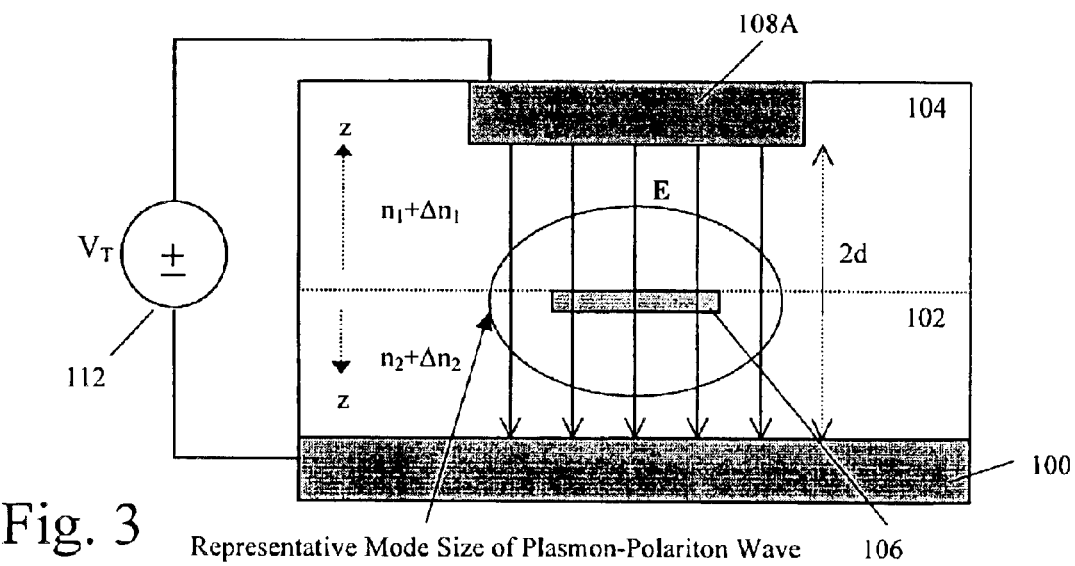
Fig. 3   Representative Mode Size of Plasmon-Polariton Wave 0 V/μm 1 V/μm 2 V/μm

Fig. 5b

Representative Mode Size of Plasmon-Polariton Wave

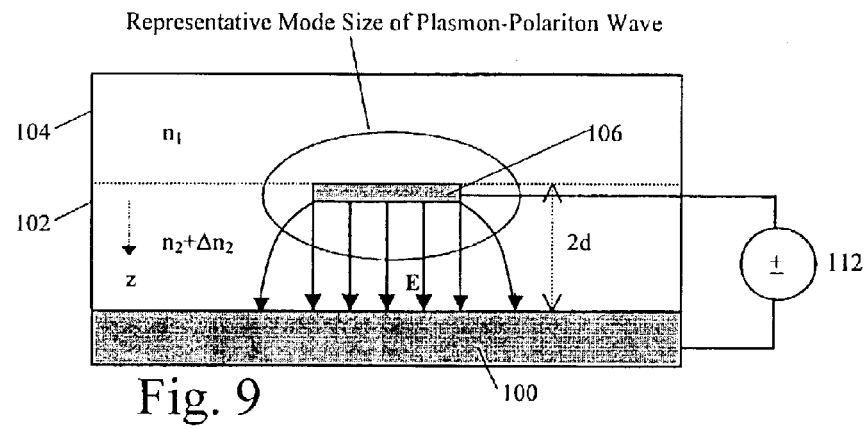
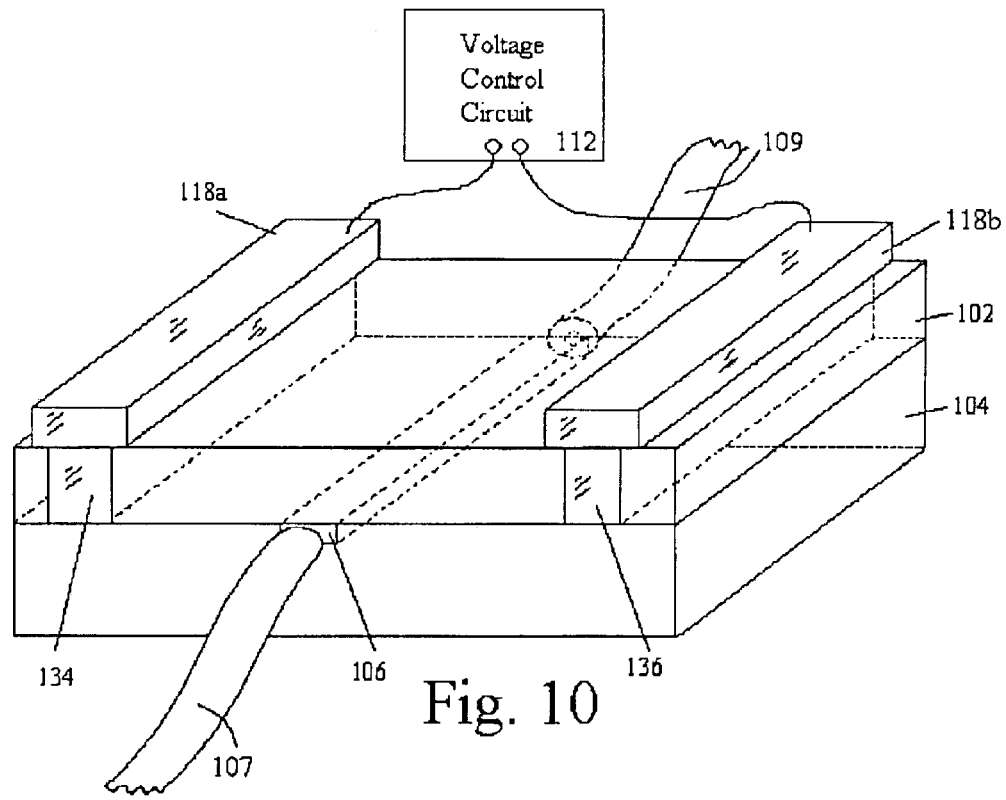

Representative Mode Size of Plasmon-Polariton Wave

ELECTRO-OPTIC MODULATORS

CROSS-REFERENCE TO RELATED APPLICATIONS

This invention claims priority from Canadian patent application number 2,388,574 filed May 31, 2002, the contents of which are incorporated herein by reference.

TECHNICAL FIELD

The invention relates to modulation or variable attenuation of optical radiation and is especially applicable to modulation means employing plasmon-polariton waveguides.

BACKGROUND ART

Known SPP modulator devices exploit the high loss associated with surface plasmons for the construction of plasmon-polariton based modulators and switches. Generally, known plasmon-polariton based modulator and switch devices can be classified along two distinct architectures. The first architecture is based on the phenomenon of attenuated total reflection (ATR) and the second architecture is based on mode coupling between a dielectric waveguide and a nearby metal. Both architectures depend on the dissipation of optical power within an interacting metal structure.

ATR based devices depend upon the coupling of an optical beam, which is incident upon a dielectric-metal structure placed in optical proximity, to a surface plasmon-polariton mode supported by a metal structure. At a specific angle of incidence, which depends on the materials used and the particular geometry of the device, coupling to a plasmon mode is maximized and a drop in the power reflected from the metal surface is observed. ATR based modulators make use of this attenuated reflection phenomenon along with means for varying, electrically or otherwise, at least one of the optical parameters of one of the dielectrics bounding the metal structure in order to shift the angle of incidence where maximum coupling to plasmons occurs. Electrically shifting the angle of maximum coupling results in a modulation of the intensity of the reflected light. Examples of devices that are based on this architecture are disclosed in U.S. Pat. Nos. 5,155,617, 5,157,541, 5,075,796, 4,971,426, 4,948,225, 4,915,482, 4,451,123, 4,432,614, 4,249,796 and 5,625,729, the contents of which are incorporated herein by reference.

The ATR phenomenon may also be employed in an optical switch or bistable device, as disclosed in U.S. Pat. No. 4,583,818, the contents of which are incorporated herein by reference.

Mode coupling devices are based on the optical coupling of light propagating in a dielectric waveguide to a nearby metal film placed a certain distance away and in parallel with the dielectric waveguide. The coupling coefficient between the optical mode propagating in the waveguide and the plasmon-polariton mode supported by the nearby metal film is adjusted via the materials selected and the geometrical parameters of the device. Means are provided for varying, electrically or otherwise, at least one of the optical parameters of one of the dielectrics bounding the metal. Varying an optical parameter (the index of refraction, say) varies the coupling coefficient between the optical wave propagating in the dielectric waveguide and the lossy plasmon-polariton wave supported by the metal. This results in a modulation in the intensity of the light exiting the dielectric waveguide. Examples of such mode-coupling SPP modulators are disclosed in U.S. Pat. Nos. 5,067,788, 6,034,809, the contents of which are incorporated herein by reference. The paper 'The proximity Effect of Conductors in Optical Waveguide Devices: coupling to Plasmon-Polariton Modes' by P. Berini, SPIE Vol. 4111, pp. 60–68, July 2000', further discusses the physical phenomenon underlying the operation of these devices.

These known modulation devices disadvantageously have limited optical bandwidth and, in the case of the ATR devices, are not readily coupled to input and output waveguides, such as optical fibers.

Modulators are known which do not use plasmon waveguide technologies, but are based upon voltage induced waveguiding, mode overlap changes, or mode extinction. For examples of these types of modulators, the reader is referred to 'Voltage-Induced Optical Waveguide Modulator in Lithium Niobate', by Jaeger et al., IEEE Journal of Quantum Electronics, Vol. 25, No. 4, 1989, pp. 720–728 and 'Improved Mode Extinction Modulator Using a Ti-Indiffused LiNbO3 Channel Waveguide', by Ashley et al., Applied Physics Letters, Vol, 45, No. 8, 1984 pp.840–842, the contents of which are incorporated herein by reference. In these types of modulators, the waveguide core is non-existent or weakly confining and the applied voltage either creates a core region where the index of refraction is raised enough to confine a mode or reduces the effective index of the mode below cut-off to induce radiation. These types of modulators have been demonstrated to suffer from at least one or all of the following limitations: high on state insertion loss, high drive voltage, and low off state extinction.

International patent applications Nos. WO 01/48521 and WO 03/001258 (Berini) disclose a modulator which can readily be coupled to a waveguide and which has more extended optical bandwidth than such known devices. The modulator comprises a waveguide structure formed by a thin strip of material having a relatively high free charge carrier density surrounded by material having a relatively low free charge carrier density, the strip having finite width and thickness with dimensions such that optical radiation having a wavelength in a predetermined range couples to the strip and propagates along the length of the strip as a plasmon-polariton wave. The surrounding material comprises two distinct portions with the strip extending between them. At least one of the two distinct portions has at least one variable electromagnetic property, and the device further comprises adjusting means for varying the value of that electromagnetic property so as to vary the characteristics of the waveguide structure and thereby the propagation characteristics of the plasmon-polariton wave. The adjusting means modulates an electric field in the at least one of the distinct portions. While such a modulator advantageously may provide a relatively high optical bandwidth and be readily coupled to a waveguide, such as an optical fiber or integrated optics waveguide channel, for it to be used effectively in optical communications it would be desirable for it to have a very low operating voltage, low insertion loss in the on state and deep extinction.

SUMMARY OF THE INVENTION

The present invention seeks to eliminate, or at least mitigate, one or more of the disadvantages or limitations of known modulators or at least provide an alternative and, to this end, provides a plasmon-polariton modulation means of the kind disclosed in International patent applications Nos. WO 01/48521 and WO 03/001258, characterized in that the surrounding material comprises first and second distinct portions with the strip extending between them and at least one electrode is positioned adjacent the strip, at least the first distinct portion being an electro-optic material having a preferred axis along which its refractive index changes preferentially. The modulation means further comprises control means for modulating a voltage applied to the at least one electrode so as to modulate the electric field. The direction of the electric field, the orientation of the material of the first distinct portion both relative to the strip, are arranged so that modulation of said electric field produces a corresponding modulation of the plasmon-polariton wave.

The foregoing summary of the invention does not necessarily disclose all the features essential for defining the invention; the invention may reside in a sub-combination of the disclosed features.

According to the present invention, there is provided modulation means comprising input means (107), output means (109) and a waveguide structure therebetween;

the waveguide structure formed by a thin metallic strip (106) surrounded by material having a relatively low free charge carrier density, the surrounding material comprising first (102) and second (104) distinct portions with the metallic strip extending at an interface between respective juxtaposed surfaces (102",104") of the first and second distinct portions, the metallic strip having finite width and thickness dimensioned such that optical radiation emitted by the input means having a wavelength in a predetermined range couples to the metallic strip and, when said first and second distinct portions are substantially index-matched, propagates along the length of the metallic strip as a plasmon-polariton wave with its transverse electric field substantially perpendicular to the width of the metallic strip;

the input means being arranged to couple said optical radiation to one end of the metallic strip so as to excite said plasmon-polariton wave and said output means being coupled to the opposite end of the metallic strip so as to receive the plasmon-polariton wave;

at least the first distinct portion (102) comprising an electro-optic material having a preferred axis along which its refractive index changes in response to an applied electric field;

electrode means (100) extending longitudinally parallel to the metallic strip, at least part of the first distinct portion extending between said electrode means and said metallic strip;

and control means (112) for applying a voltage ($V_T$) to the electrode means so as to establish an electric field (E) in said first distinct portion, the orientation of said preferred axis of the electro-optic material relative to said metallic strip, and the positioning of the electrode means relative to said metallic strip both being such that variation of said refractive index is in a direction that extends transversely of, and preferably is substantially perpendicular to, said width of the metallic strip;

said control means (112) being operable to modulate said voltage so as to vary said refractive index of said first distinct portion relative to that of said second distinct portion, such that a plasmon-polariton wave propagating along the metallic strip will be correspondingly modulated.

Such a modulation means advantageously may operate with deep extinction, i.e., the propagating wave is substantially cut off. The term "cut off" refers to the elimination of any supported bound propagating plasmon-polariton waves. The change in the electromagnetic property, specifically the refractive index (or permittivity) due to the asymmetry in the index of refraction may be sufficient that the propagating plasmon-polariton wave is no longer supported; or is so highly attenuated as to be effectively not supported.

The electrode means may comprises first (100) and second (108) electrodes disposed at opposite sides, respectively, of the metallic strip (106), and spaced apart in said perpendicular direction, said first distinct portion (102) being between the first electrode (100) and the metallic strip (106) and the second distinct portion (104) being between the second electrode (108) and the metallic strip (106), said second distinct portion (104) also comprising electro-optic material having a preferred axis along which its refractive index changes in response to an applied electric field, the respective preferred axes of the first and second distinct portions both extending substantially parallel to said perpendicular direction but oriented in opposite directions, and wherein the control means (112) applies said voltage between the first and second electrodes so as to establish said electric field (E) in the same direction in both first and second distinct portions.

Alternatively, the electrode means may comprise first (100) and second (108) electrodes disposed at opposite sides, respectively, of the metallic strip (106), and spaced apart in said perpendicular direction, said first distinct portion (102) being between the first electrode (100) and the metallic strip (106) and the second distinct portion (104) being between the second electrode (108) and the metallic strip (106), said second distinct portion (104) also comprising an electro-optic material having a preferred axis along which its refractive index changes in response to an applied electric field, the respective preferred axes of the first and second distinct portions both extending substantially parallel to said perpendicular direction and both oriented in the same direction, the control means (112) being connected to the first and second electrodes (100, 108) and to the metallic strip (106) and applying first ($V_A$) and second ($V_B$) voltages to the first (100) and second (108) electrodes respectively, relative to the metallic strip (106), so as to establish first ($E_A$) and second ($E_B$) electric fields in the first and second distinct portions respectively, the first and second electric fields being in opposite directions, and wherein the control means (112) modulates both applied voltages ($V_A$, $V_B$).

It is also possible to use the strip as an electrode. Thus, in one embodiment of the invention the electrode means comprises an electrode (100) spaced apart from said metallic strip (106) in said perpendicular direction and the control means (112) applies said voltage ($V_T$) between the metallic strip (106) and the electrode (100), the preferred axis of the material of the first distinct portion extending parallel to said perpendicular direction.

In yet another preferred embodiment of the invention, the first distinct portion (102) is oriented with said preferred axis transversely to said metallic strip (106), preferably extending substantially parallel to the width of the metallic strip (106), the electrode means comprises first and second electrodes (134,136) disposed at opposite sides, respectively, of the metallic strip (106) and spaced apart along said preferred axis with said first distinct portion (102) therebetween, and the control means (112) applies said voltage between the first and second electrodes (134,136) such that the direction of the electric field (E) in the first distinct portion (102) is parallel to said preferred axis.

The foregoing and other objects, features, aspects and advantages of the present invention will become more apparent from the following detailed description, in conjunction with the accompanying drawings, of preferred embodiments of the invention, which are described by way of example only and without limitation to the combination of features necessary for carrying the invention into effect.

BRIEF DESCRIPTION OF DRAWINGS

FIG. 2 is a plan view of the modulator of FIG. 1;

FIG. 3 is a partial cross-sectional end view of the modulator of FIG. 1;

FIG. 5b illustrates experimental outputs of the modulator;

FIG. 9 is a partial cross-sectional end view of a third embodiment of the invention;

FIG. 10 is a schematic perspective view of a fourth embodiment of the invention;

DESCRIPTION OF THE PREFERRED EMBODIMENTS

Figure 1:
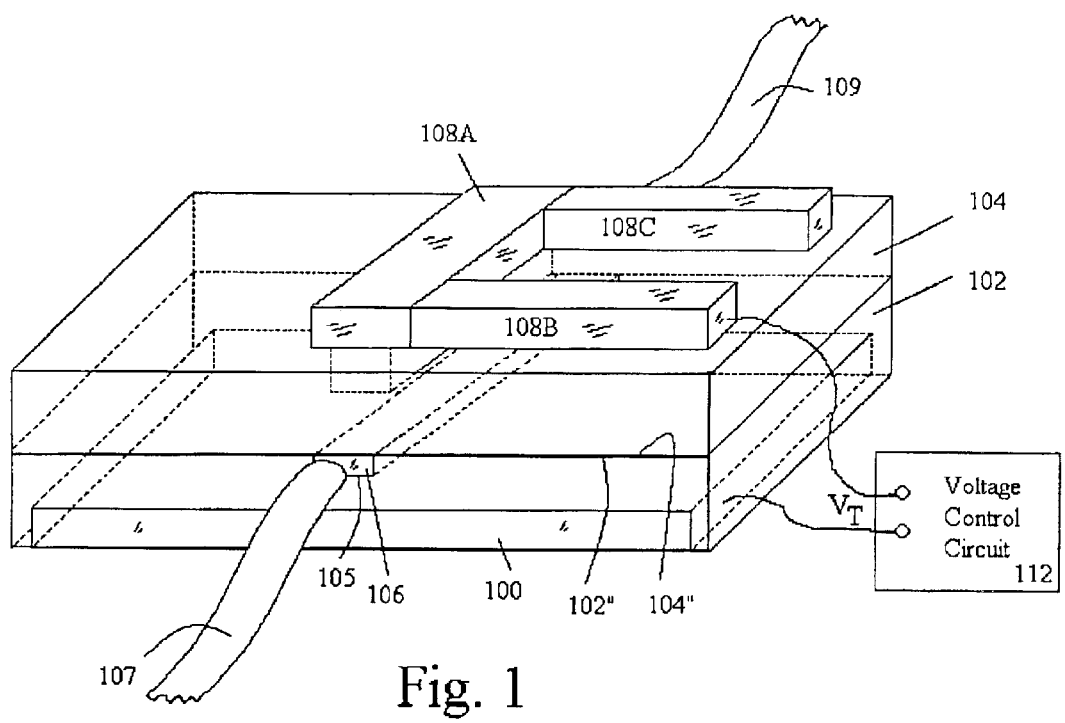
FIG. 1 is a perspective schematic illustration of a modulator according to a first embodiment.

A first embodiment of the invention, the modulator illustrated in FIGS. 1, 2 and 3, comprises a die formed by two wafer portions of electro-optic material 102 and 104 having respective opposed flat surfaces 102" and 104" wafer-bonded together. A thin metal waveguide strip 106 deposited in a trench 105 formed (e.g. etched) in the surface 102" extends the length of the die. Opposite ends of strip 106 are coupled to input and output waveguides 107 and 109, e.g., optical fiber waveguides, waveguides in an integrated optics device, or other plasmon polariton waveguides. The input waveguide is arranged such that the substantially TM polarized plasmon-polariton wave is excited efficiently. For example, the waveguide 107 could be a polarization-maintaining fiber connecting a polarized light source to the strip 106 with appropriate orientation. Alternatively, the input waveguide 107 could be the output plasmon-polariton waveguide of the external cavity laser disclosed in copending U.S. Provisional patent application No. 60/459,717 filed Dec. 20, 2002, the contents of which are incorporated herein by reference. Light coupled into the strip 106 will propagate along the strip 106 as a plasmon-polariton wave in the manner described in U.S. Pat. No. 6,442,231 and International patent applications Nos. WO 01/48521 and WO 03/001258, the contents of which are incorporated herein by reference, and leave the modulator by way of output waveguide 109.

A ground plane electrode 100 provided on the lowermost (as shown) surface of wafer portion 102 extends across the entire length and width thereof. A second electrode comprises an elongate section 108A extending along the uppermost (as shown) surface of wafer portion 104 so as to overlie the strip 106. Opposite ends of the section 108A are connected by branches 108B and 108C, respectively, to one output terminal of a modulation control unit 112 and the ground plane electrode 100 is connected to the other output terminal.

The ground plane electrode 100 need not extend across the entire length and width of the modulator. For example, it could be an elongate electrode extending the length of the strip 106 and either side of it and be coupled by way of a conductive via to a strip electrode running alongside the electrode 108A which would then connect it to the modulation control unit 112.

The modulation control unit 112 applies a DC bias voltage ($V_B$) and high frequency modulation ($V_{RF}$) voltage across the electrodes. The high frequency signal ($V_{RF}$) is a data signal which modulates the light propagating along the strip 106.

In this preferred embodiment, both of the wafer portions 102 and 104 comprise $LiNbO_3$. The z-axes of the wafer portions 102 and 104, respectively, are aligned antiparallel. Specifically, the positive z face of one crystal wafer portion is bonded to the positive z face of the other crystal wafer portion (or the negative face with the negative face) so that refractive index changes of opposite signs are produced in the layers, as shown in FIG. 3 by variation of the electric field produced by the modulation voltage $V_{RF}$.

Figure 5A:
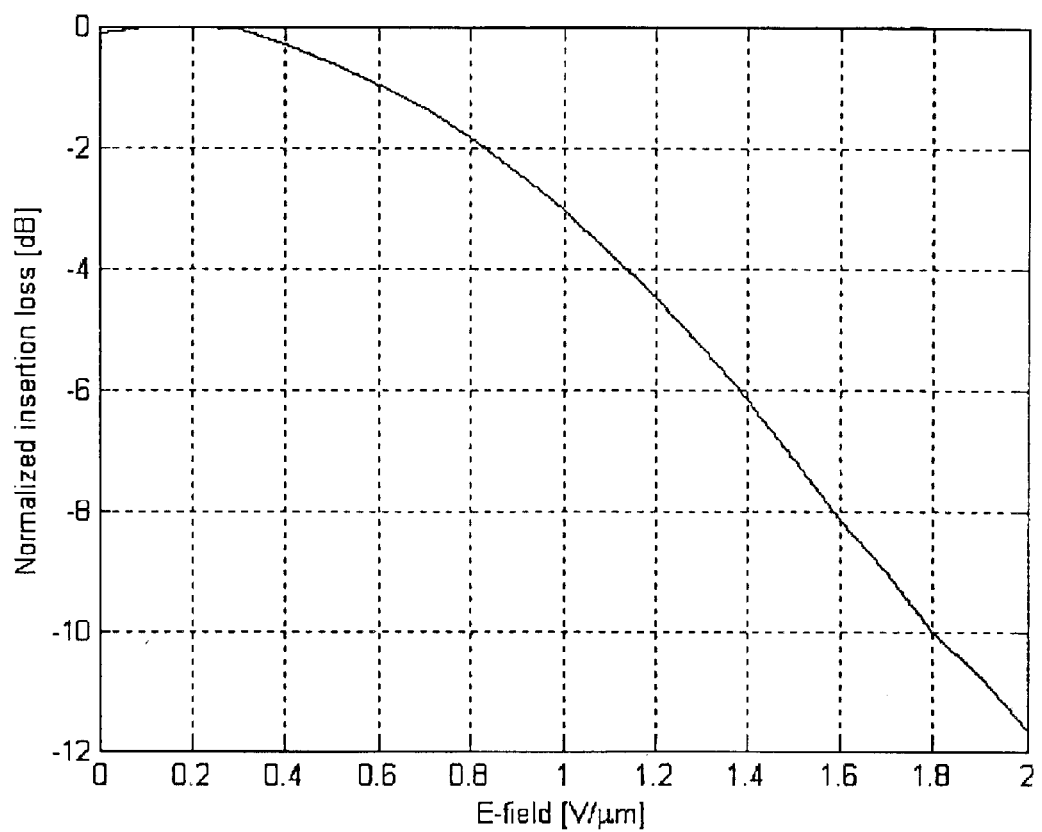
FIG. 5a illustrates variation of normalized insertion loss with electric field for the modulator.

FIG. 5a shows experimental results for a modulator of length about 2 mm configured as shown in FIG. 1 in which the strip 106 comprises a 0.95 μm wide, 22 nm thick Au metal film in $LiNbO_3$ wafer portions 102 and 104 and the light source supplies light at a free space wavelength of λ=1550 nm. FIG. 5a is a plot of normalized insertion loss versus electric field intensity E applied to the wafer portions 102 and 104. It will be appreciated that the voltage required to be applied to the electrodes for a particular electric field strength will depend upon the spacing between the electrodes (or electrode and strip in some embodiments). Examples of specific voltages and spacings will be given later. As shown in Figure, the modulator has a very linear operation over part of its transfer characteristic. An extinction ratio of about 12 dB is seen for an applied field of 2V/μm. This corresponds to an index of refraction asymmetry of approximately $5.8*10^{-4}$.

Figure 5B:
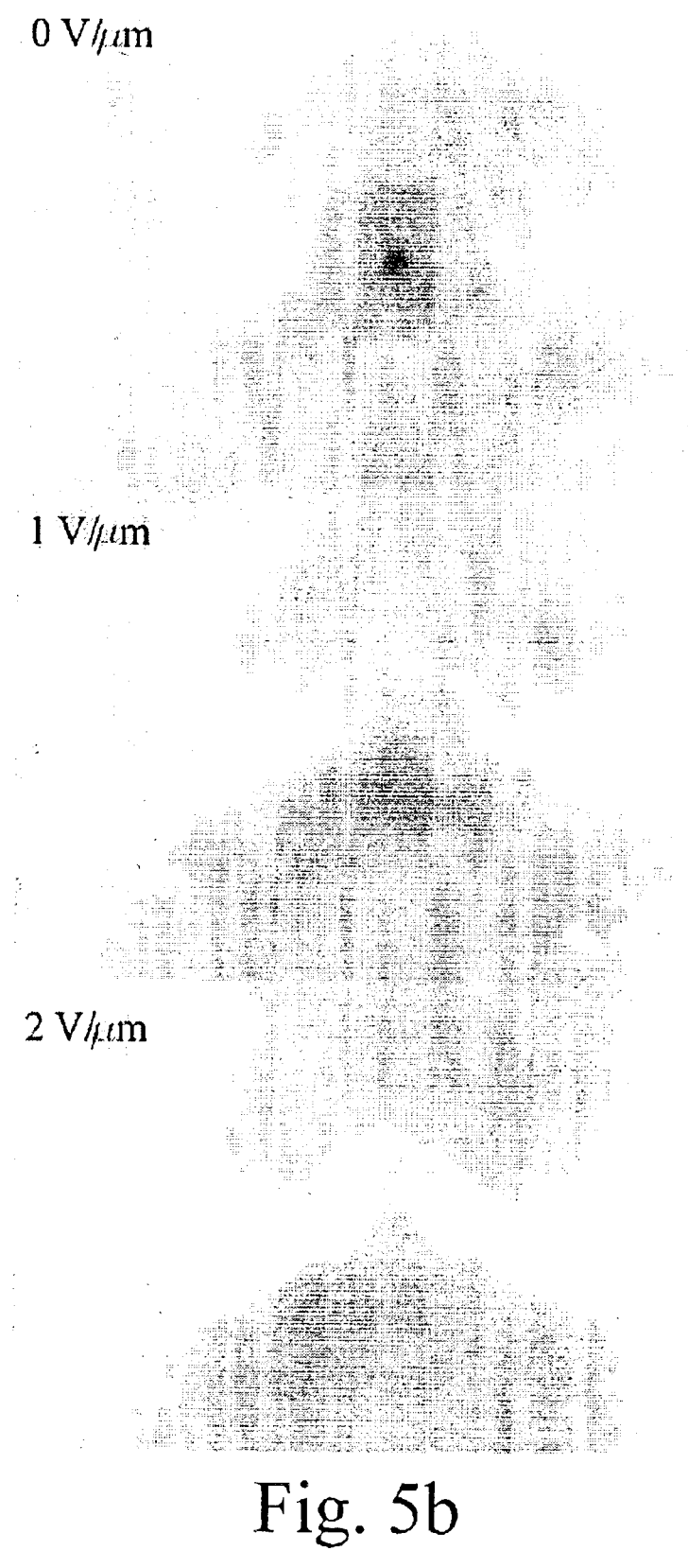

FIG. 5b shows a sequence of experimental outputs for the preferred embodiment of FIG. 1. FIG. 5b shows the negative of the actual image for clarity, such that a darker spot represents a higher optical intensity. In the top image the mode is in the on-state and is very symmetric as seen by the dark circle at the center. As an electric field is applied, the mode becomes asymmetric as shown in the middle diagram. The bottom diagram shows the mode cutoff. The background light seen in the first diagram is due mainly to mode coupling mismatch as these modulators did not incorporate mode matching sections for coupling to fiber. Such mode matching sections, e.g. tapers, can be incorporated into the modulator design in the manner described in U.S. Pat. No. 6,442,231 and International patent applications Nos. WO 01/48521 and WO 03/0012581, supra.

The bottom image in FIG. 5b shows that the waveguide is indeed cutoff at an applied field of 2 V/μm, since at this drive level, almost no light is guided by the center region.

The dimensions of the strip, spacing of the electrodes, operating voltage, wavelength of excitation and materials used for the strip and the wafer portions can be varied according to the application for the modulator. The manner in which they can be determined for a particular application will now be described.

Although the above-described embodiment employs lithium niobate for the wafer portions 102 and 104, it could employ instead other materials selected from the class of linear electro-optic materials where the index of refraction change is in the direction parallel to the applied field. This effect is well known and well documented by Yariv and Yeh in a book entitled "Optical Waves in Crystals", John Wiley & Sons, New York, chap 7 (1984), so minimal theory will be repeated here. This effect is common in linear electro-optic materials from crystal symmetry groups such as the 3 m group which includes Lithium Niobate (LiNbO$_3$), and Lithium Tantalate (LiTaO$_3$), the 2 mm group which includes Potassium Titanyl Phosphate also known as KTP (KTiOPO$_4$), the 4 mm group which includes the tetragonal linear phases of PLZT, electro-optic materials from symmetry groups 3, 4, 6 and 6 mm. Other crystals that are z-cut such that the z-axis or extraordinary axis of the crystal is oriented parallel to the applied electric field are suitable. Certain electro-optic polymers are also suitable candidate materials. The change $\Delta n$ in the index of refraction along this same axis is given by $$\Delta n = -\frac{1}{2}n^3 rE$$

where n is the nominal zero applied electric field index of refraction of the electro-optic material, r is the electro-optic coefficient and E is the applied field. The effect is linear with E and the sign of the change in index of refraction depends on the sign of the applied field.

When using these particular materials in this modulator it is advisable to align the z-axis of the crystal with the normal to the largest dimension of the cross-section of the strip 106 and parallel to the applied electric field. In this way the highly TM polarized plasmon-polariton wave is maximally affected.

Figure 4:
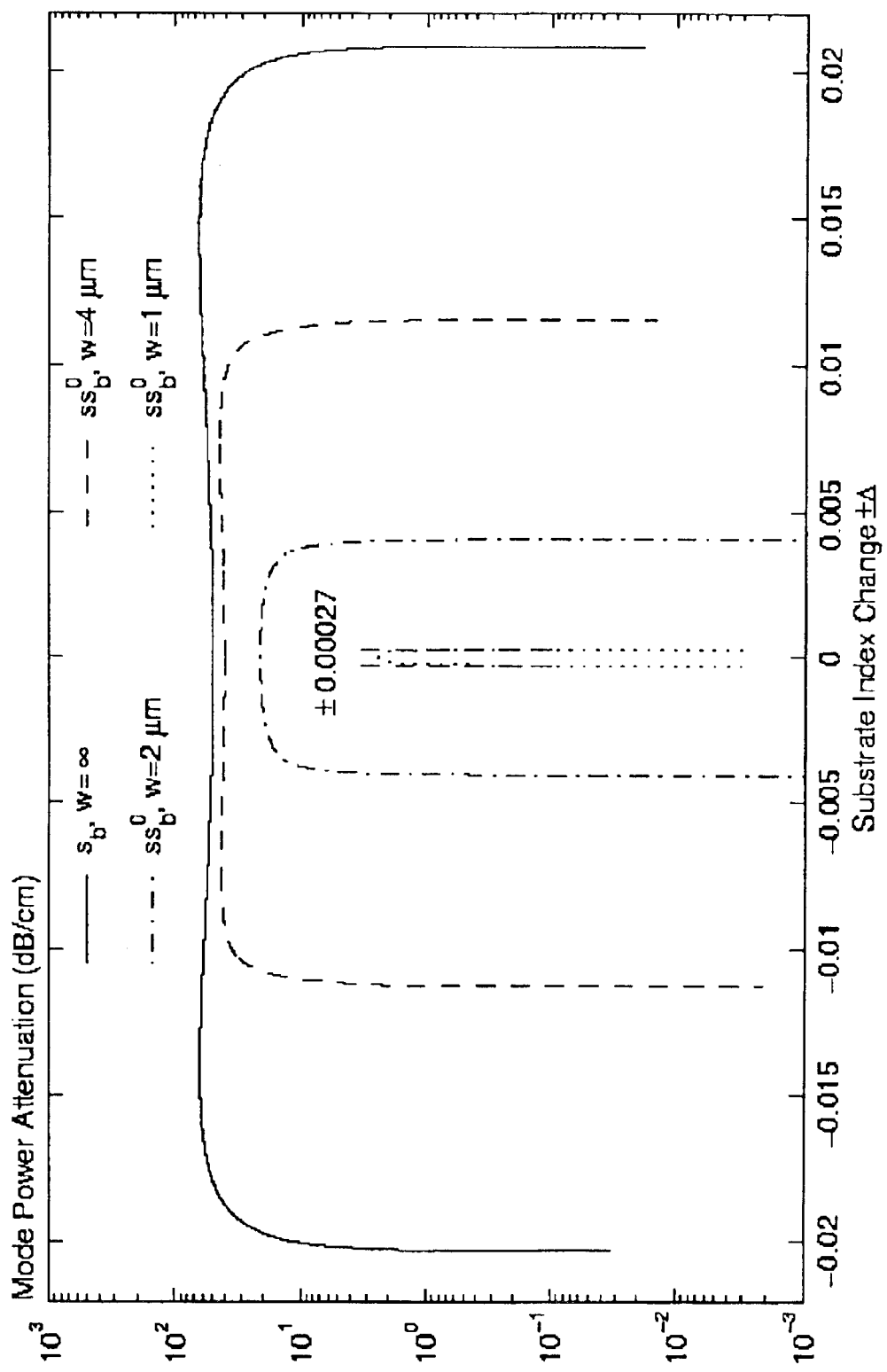
FIG. 4 shows curves representing attenuation and location of cut-off points for plasmon-polariton waves in the modulator.

FIG. 4 shows the theoretical modal attenuation curves for the modulator of FIG. 1 using Au as the strip 106 both of the wafer portions 102 and 104 are made from z-cut LiNbO3, and the wavelength of excitation has a free-space wavelength of 1550 nm. Mode cutoff occurs at the points where the modal attenuation vanishes. At such a point the optical field extends completely into the highest index cladding region so there is no modal loss associated with the metal waveguide strip 106. At these points a bound mode is no longer supported and any input light is radiated away from the waveguide core. The on-state attenuation can be found at the centre of the curve at the point where the substrate index of refraction change is zero (ie. where the upper and lower cladding regions 102 and 104 are index matched).

For lithium niobate and other materials with index of refraction around n=2.2, good dimensions for the metallic strip are widths of w=0.7 $\mu$m to w=1.2 $\mu$m for thicknesses of t=15 nm to t=25 nm. These dimensions will keep the on-state modal insertion loss below 10 dB/cm.

Particularly good strip dimensions can be inferred from FIG. 4. When the strip 106 has width w=1 $\mu$m and thickness t=20 nm and an insertion loss of about 2.5 dB/cm, it is considered cutoff (as the modal attenuation decreases to zero), for a change of index of refraction of $\Delta n=2.7*10^{-4}$. Cutoff plasmon-polariton waveguides are not limited to Au films in lithium niobate; using appropriate dimensions for the strip 106, the modulator will work for a variety of metals and electro-optic material combinations. This device is also not limited to operating at $\lambda_0$=1550 nm, but for appropriate dimensions will also work over the entire optical communications range, typically extending from 0.8 $\mu$m to 2 $\mu$m.

It is usually desirable for the drive voltage $V_{RF}$ to be low enough for the modulation control unit 112 to use conventional drive circuitry. The operating voltage applied to achieve a required electric field strength in the vicinity of the strip 106 can be reduced if the external electrodes are brought closer to the strip 106. However, if they are so close to the strip that they couple to the plasmon-polariton wave, this interaction would cause the modal attenuation to increase. Such an increase can be offset by a decrease in the width or thickness of the SPP waveguide. It can also be mitigated by using a layer of a transparent conductive dielectric material such as ITO in place of the external electrodes, or as an intermediate layer with a thickness of about 1 $\mu$m between the external electrodes 108A or 100 and the electro-optic regions 104 and 102 respectively. Such a material behaves as a conductor at low frequencies and a dielectric at optical wavelengths.

Typical index of refraction differences in the wafer portions 102 and 104 sufficient for cutoff are $10^{-4}$ to $10^{-3}$, although lower and higher values are required for weaker and stronger confining waveguides, respectively. For the purpose of consistency between the description of the above-described embodiment and the descriptions of other embodiments to be described later, an index of refraction asymmetry of $2*10^{-4}$ will be used for cutoff throughout.

From FIG. 4 this corresponds to a waveguide width of about 0.7 to 0.8 $\mu$m in the case of an Au strip 106 in lithium niobate wafer portions 102 and 104. Similar strip dimensions are needed for most metals in cladding materials of similar index of refraction.

Assuming a simple parallel plate field model, the applied electric field strength between electrodes 100 and 108A shown in FIG. 3 is approximately found by:

$$E=-(2*d)^{-1}*(V_B+V_{RF}*\sin(\omega t))$$

where $\omega$ is the angular frequency of the modulating signal. The changes in index of refraction in regions 104 and 102 respectively are found from:

$$\Delta n_1 = -0.5 n^3 rE$$

$$\Delta n_2 = -\Delta n_1$$

The lower the ratio $V_{RF}:(V_{RF}+V_B)$ is the better since this represents more of the RF power being replaced by a constant DC source, which lowers the power dissipated by the modulator. To lower the high-frequency drive voltage, the modulator must be biased away from the $\Delta$=0 point. The amount of bias voltage required will be determined by the optical performance at the bias point.

The mode cutoff effect is a strong function of the strip geometry. For appropriate strip dimensions as mentioned above, an asymmetry in the index of refraction of $\Delta n_{12}=2\times 10^{-4}$ is sufficient for cutoff to occur, where $\Delta n_{12}=|\Delta n_1-\Delta n_2|=2*|\Delta n_1|$ represents the total difference in index between the portions 104 and 102.

LiNbO$_3$ has a high frequency electro-optic coefficient of approximately 30 pm/V and an extraordinary index of refraction of approximately 2.1377 at a free space wavelength of 1550 nm. It is possible to calculate the necessary electric field for $\Delta n_{12}=2\times 10^{-4}$ as $E_{cutoff}$=0.68 V/$\mu$m.

From this the total required applied voltage is $V_T=V_{RF}+V_B$ is found:

$$V_T(d)=2*d*E\text{cutoff}$$

For a few representative cases, $V_T$ values are:

$V_T(5\ \mu m) = 6.8$ V $V_T(10\ \mu m) = 14$ V $V_T(500\ \mu m) = 680$ V

The bias voltage $V_B$ will be at least half of this value and the high frequency voltage $V_{RF}$ will thus oscillate the total voltage between 0 volts and $V_T$. A modulator constructed from an Au strip in LiNbO$_3$ should then be operational with $V_B$=3.4V and $V_{RF}$=3.4V.

In this embodiment there will be very little chirp as the phase increase caused by an index of refraction increase in one portion (say, 102) is compensated by a phase decrease caused by an index of refraction decrease in the other portion (104).

Figure 6:
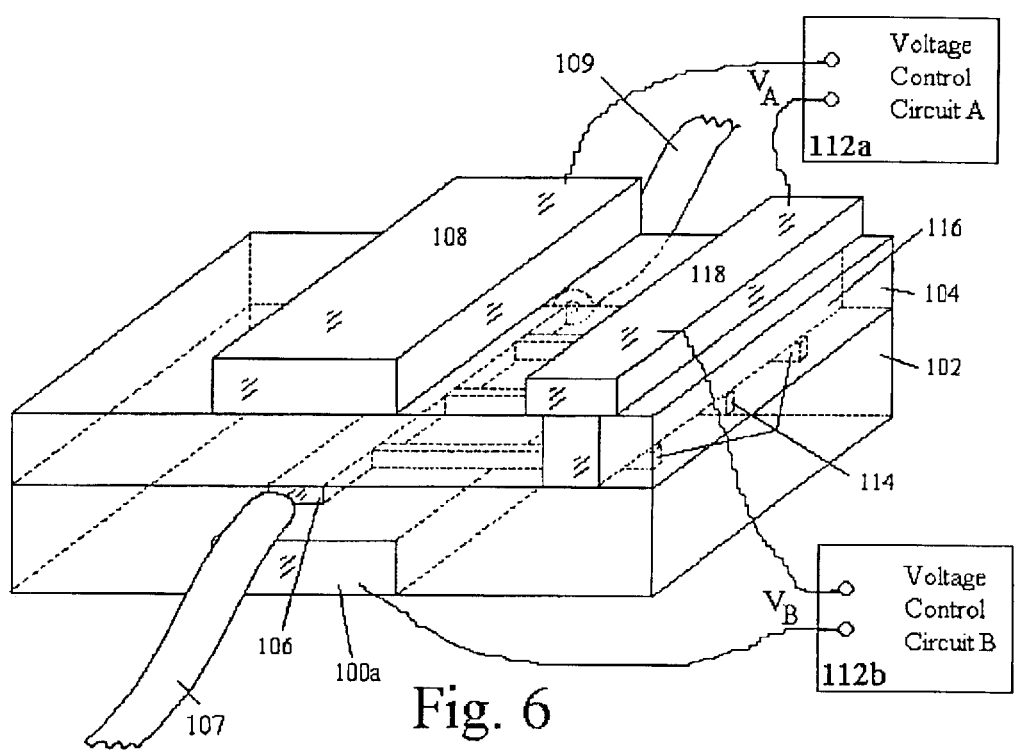
FIG. 6 is a perspective schematic view of a modulator which is a second embodiment of the invention.
Figure 7:
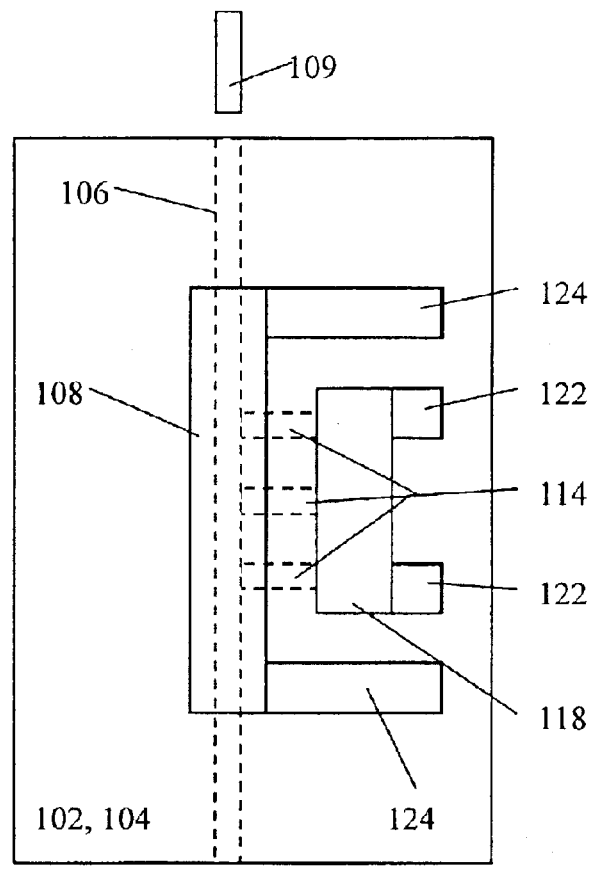
FIG. 7 is a plan view of the modulator of FIG. 6.
Figure 8:
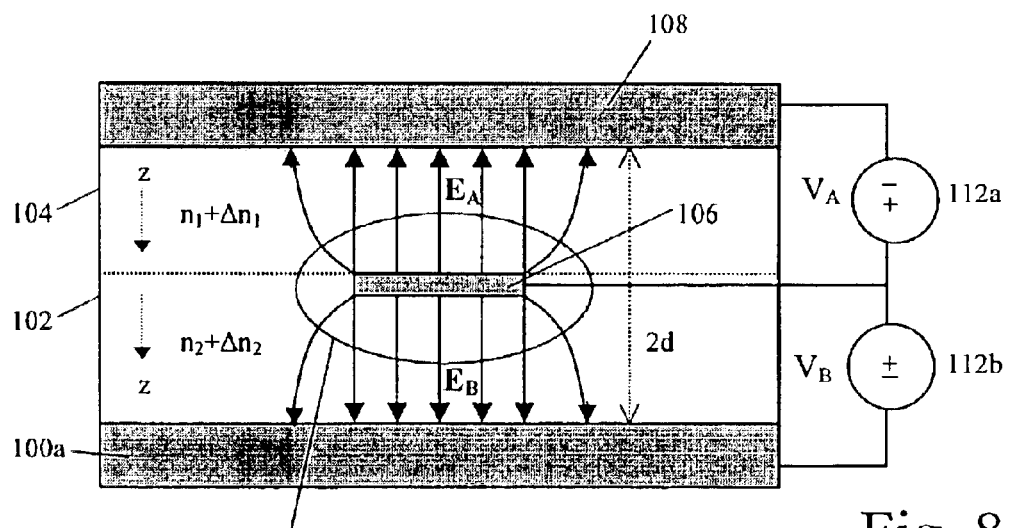
FIG. 8 is a partial cross-sectional end view of the modulator of FIG. 6.

Because the strip 106 is a conductor, it too can be used as an electrode. Thus, FIGS. 6, 7 and 8 illustrate a second embodiment in which the operating voltage is applied between strip 106 and external electrodes 100a and 108 on the outermost surface of the electro-optic wafer portions 102 and 104, respectively. A plurality of optically non-invasive branch connector elements 114, similar in width and thickness to waveguide strip 106, spaced at intervals along the length of the waveguide strip 106 extend laterally from one side of the waveguide strip 106 to a parallel via 116 which is filled and capped with an electrode pad 118 so that electrical contact can be made to the waveguide 106 from the top of the modulator die. It should be noted that electrode pad 118 does not overlie the strip 106, and is positioned sufficiently far away from the strip 106 so as to not interact with the plasmon-polariton wave propagating along the strip 106.

FIG. 7 shows connecting electrodes 122 and 124 whereby the modulation control unit 112 can be connected to the modulator from one side. The electrodes 100a and 108 are connected in common to one terminal of the modulation control unit 112 and the electrode pad 118, and hence strip 106, are connected to the other terminal. As a result, the electric fields applied to the wafer portions 102 and 104 are in opposite directions, as shown in FIG. 8.

The electro-optic wafer portions 102 and 104 use the linear electro-optic effect described with respect to the embodiment of FIGS. 1 to 3. Using z-cut LiNbO$_3$ again, the z-axis of the crystal above and below the waveguide strip 106 are aligned parallel. Specifically, the positive z face of one crystal wafer portion 104 is bonded to the negative z face of the other crystal wafer portion 102 (or the negative z face of 104 with the positive z face of 102) so that refractive index changes of opposite sign are produced in the layers, as shown in FIG. 8, by variation of the electric field produced by the modulation voltage $V_{RF}$. Since the applied electric fields are oppositely directed with respect to the center as shown in FIG. 8, they produce index of refraction changes of opposite signs in the two wafer portions 102 and 104.

The on-state optical performance is the same as, or very similar to, that of the embodiment of FIGS. 1 to 3.

The applied electric field strength and index of refraction changes are approximately found by:

$$E = \pm\frac{1}{d}(V_B + V_{RF}\sin(\omega t))$$

$$\Delta n_1 = -\frac{1}{2}n^3 r \cdot E$$

$$\Delta n_2 = -\Delta n_1$$

Again requiring $\Delta n_{12}$=2×10$^{-4}$ to cutoff the mode and converting this to E now gives: $E_{cutoff}$=0.68 (V/$\mu$m), which is the same field strength as in the first embodiment. The total voltage $V_T$=$V_{RF}$+$V_B$ is now halved since the field is applied over half the distance:

$$V_T(d) = d*E_{cutoff}$$

For a few representative cases, $V_T$ values are:

$V_T(5\ \mu m) = 3.4$ V $V_T(10\ \mu m) = 6.8$ V $V_T(500\ \mu m) = 340$ V

Because this second embodiment uses the strip 106 as an electrode, and applies the operating voltage to the strip and to electrodes above and below the optical region, the required voltage is reduced by 50% as compared with the embodiment of FIGS. 1, 2 and 3. Again the bias voltage will be at least half of this value and the high frequency voltage will thus oscillate the total voltage between 0 volts and $V_T$. A modulator constructed from an Au strip in LiNbO$_3$ should then be operational with $V_B$=1.7V and $V_{RF}$=1.7V.

In this embodiment there will be very little chirp as the phase increase caused by an index of refraction increase in one portion (say, 102) is compensated by a phase decrease caused by an index of refraction decrease in the other portion (104).

When the strip 106 is used as an electrode, it is possible to omit one of the outermost electrodes. FIG. 9 illustrates a third embodiment in which the uppermost electrode 108 and the associated drive circuitry have been omitted; otherwise the modulator is similar to that described with reference to FIG. 8. The strip 106 again acts as an electrode (as in the second embodiment) and the modulation control unit 112 applies the operating voltage between the strip 106 and the ground plane electrode 100a. As before, the strip 106 may be connected by a series of branch electrode elements 114 and a via 116 to an electrode pad 118 on the outmost surface of wafer portion 104. It should be noted that electrode pad 118 does not overlie the strip 106, and is positioned sufficiently far away from the strip 106 so as to not interact with the plasmon-polariton wave propagating along the strip 106. In this embodiment, the lower electro-optic wafer portion 102 uses the linear electro-optic effect as described in the previous embodiments and requires the z-axis of the material to be parallel to the applied field as shown. The z-axis can be oriented either positive or negative with respect to the electric field, but must be aligned with the polarization of the plasmon-polariton wave. The applied electric field strength and index of refraction changes are approximately found by:

$$E = -\frac{1}{d}(V_B + V_{RF}\sin(\omega t))$$

$$\Delta n_2 = -\frac{1}{2}n^3 r \cdot E$$

$$\Delta n_1 = 0$$

In this case the total change in index of refraction is contained within the lower electro-optic wafer portion 102.

The wafer portions 102 and 104 can be made of the same material. Alternatively, the lower "active" wafer portion 102 could be of an electro-optic material and the upper "non-active" wafer portion 104 could be a passive dielectric, so long as $\Delta n_{12}=|\Delta n_1-\Delta n_2|=0$ for zero applied electric field.

Again using an index of refraction asymmetry of $\Delta n_{12}=2\times10^{-4}$ for cutoff to occur, the necessary electric field applied is now $E_{cutoff}=1.36$ V/$\mu$m for LiNbO$_3$. From this the required voltage is $V_T=V_{RF}+V_B$, so $V_T(d)=d*E_{cutoff}$. For a few representative cases, $V_T$ values are:

$V_T(5\ \mu\text{m})=6.8$ V $V_T(10\ \mu\text{m})=14$ V $V_T(500\ \mu\text{m})=680$ V It should be noted that the operating voltage for the embodiment of FIG. 9 is the same as in the first embodiment, since, although the electric field is applied across a smaller separation, only one portion is affected. Again the bias voltage will be at least half of this value and the high frequency voltage will thus oscillate the total voltage between 0 volts and $V_T$. A modulator constructed with a Au strip 106 in LiNbO$_3$ wafer portions 102 and 104 should then be operational with $V_B=3.4$V and $V_{RF}=3.4$V.

It should be recognized that the electric field may be applied between either wafer portion 102 or 104 although it is only shown for the lower wafer portion 104 in FIG. 9.

A version of the embodiment of FIG. 9 could be constructed using a Kerr material where the change in index of refraction is a function of the square of the applied electric field. Since the effect is independent of the sign of the applied field, however, the same modification cannot be made to the embodiments of FIGS. 1 and 8.

The Kerr effect is described by Yariv and Yeh in their book entitled "Optical Waves in Crystals", John Wiley & Sons, New York, p256 (1984). It dominates in a quadratic electro-optic material such as certain phases of BaTiO$_3$, PZT, the chalcogenide glasses, in particular the As—Se—S based glasses As$_2$S$_3$ and As$_2$Se$_3$, and some polymers, among other materials. Of note is PLZT, which is a composition dependant ferroelectric material usually consisting of the following ratios of atoms: $(Pb_{1-x}La_x)(Zr_yTi_{1-y})O_3$ and is commonly referred to by composition as (x/y/1-y). The relaxor phases with La atomic percentages in the range from x=8 to x=10, with y=35 have high Kerr electro-optic coefficients, in particular the compositions 8/65/35, 8.5/65/35 and 9/65/35. Certain electro-optic polymers are also suitable candidate materials.

An external electric field will induce a change in the index of refraction in either the direction aligned with the applied field or perpendicular to it or both. Typically the index change is smaller in the direction perpendicular to the applied field thus it is advantageous to exploit the index change parallel to the applied field making it suitable for this embodiment.

Kerr materials occur typically in amorphous or cubic form. In the case of a cubic crystal, the applied field should be directed parallel to one of the crystal axes so long as the normal to the surface to the waveguide is similarly aligned. The change in index of refraction is $$\Delta n = -\frac{1}{2}n^3 R E^2$$

where n is the nominal zero field index of refraction of the electro-optic material, R is the Kerr electro-optic coefficient and E is the applied electric field. The effect is quadratic with E and the sign does not depend on the sign of the applied electric field. Thus for a particular material with R>0 the index of refraction can only be decreased along this direction. The applied electric field and change in index of refraction is approximately found from:

$$E = -\frac{1}{d}(V_B + V_{RF}\sin(\omega t))$$

$$\Delta n_2 = -\frac{1}{2}n^3 R \cdot E^2$$

$$\Delta n_1 \cong 0$$

Again using an index of refraction asymmetry of $\Delta n_{12}=2\times10^{-4}$ for cutoff to occur, and using the Kerr material PLZT in the 9/65/35 relaxor composition for region 102 with a Kerr electro-optic coefficient $R=10*10^{-16}$ m$^2$/V$^2$ and an index of refraction of n=2.3, the necessary applied electric field is $E_{cutoff}=0.18$ V/$\mu$m. From this the required voltage is $V_T=V_{RF}+V_B$, so $V_T(d)=d*E_{cutoff}$.

For a few representative cases, $V_T$ values are:

$V_T(5\ \mu\text{m})=0.9$ V $V_T(10\ \mu\text{m})=1.8$ V $V_T(500\ \mu\text{m})=90$ V Using a 9/65/35 PLZT based modulator is seen to greatly reduce the necessary drive voltage for modulation. A bias voltage $V_B$ as discussed above may not be necessary due to the low drive voltage of this construction.

In this embodiment the chirp can be designed either positive or negative depending on whether the index of refraction in the active region is increased or decreased.

It should be recognized that the electric field may be applied between either wafer portion 102 or 104 although it is only shown for the lower wafer portion 104 in FIG. 9.

A fourth embodiment, which makes use of another class of linear electro-optic materials, will now be described with reference to FIGS. 10, 11 and 12. In this class of linear electro-optic materials, especially those from the symmetry group $\overline{4}2m$ namely KDP (KH$_2$PO$_4$), DKDP or KD*P (KD$_2$PO$_4$), ADP ((NH$_4$)H$_2$PO$_4$), AD*P ((NH$_4$)D$_2$PO$_4$) and also including others, where the crystal wafer is cut so that the normal to its largest face is at a 45 degree angle to the x and y axes of the crystal and the z axis is in the plane of this surface, an applied electric field parallel to the z-axis will cause a change in the index of refraction $\Delta n$ normal to the surface given by $$\Delta n = -\frac{1}{2}n^3 r E$$

where n is the nominal zero field index of refraction of the electro-optic material, r is the electro-optic coefficient and E is the applied electric field. The effect is linear with E and the sign of the change in index of refraction depends on the sign of the applied field.

Figure 12:
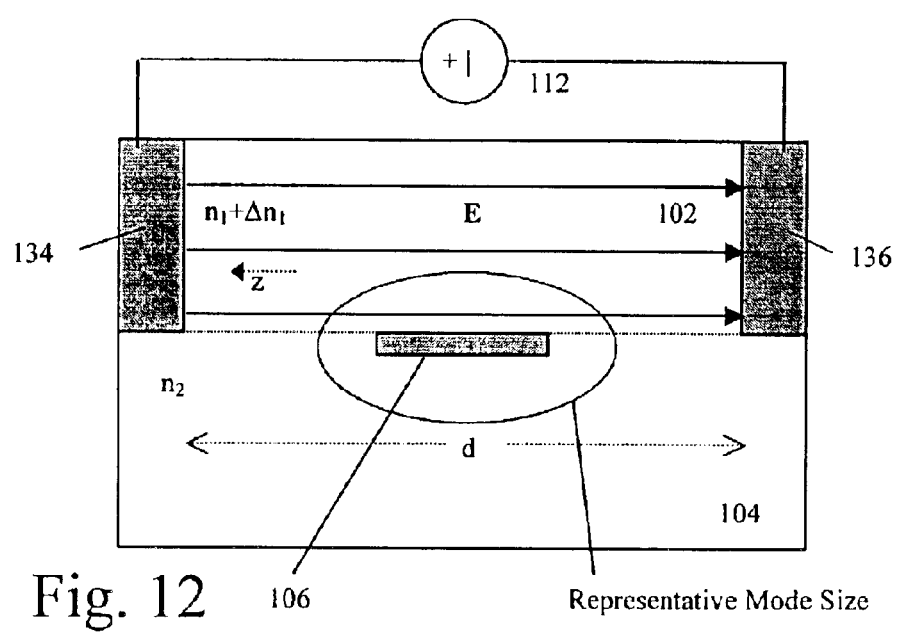
FIG. 12 is a partial cross-sectional end view of the embodiment of FIG. 10.

When using these particular materials in this modulator it is advisable to align the x and y axes of the crystal at a 45 degree angle to the normal to the largest dimension of the strip cross-section and to have the applied electric field acting along the z-axis of the crystal as shown in FIG. 12. In this way, the highly TM polarized plasmon-polariton wave is maximally affected. This specific orientation of KDP is well documented by Yariv and Yeh in their book entitled "Optical Waves in Crystals", John Wiley & Sons, New York, p226 (1984) and will not be exhaustively described here.

Figure 11:
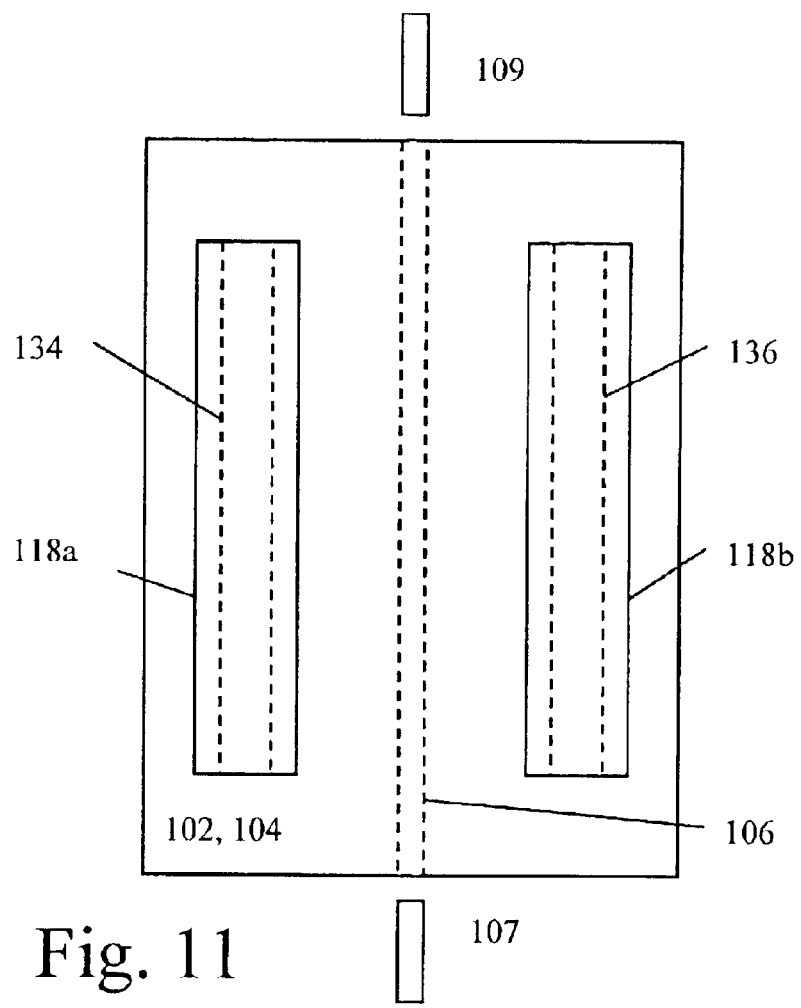
FIG. 11 is a plan view of the embodiment of FIG. 10.

The modulator shown in FIGS. 10–12 uses KDP or like materials oriented as described above, with external electrodes 134 and 136 extending within the upper wafer portion 104 one on each side of the waveguide strip 106. The electrodes 134 and 135 are connected to electrode pads 118a and 118b, respectively. The modulation control unit 112 applies the operating voltage between the electrodes 134 and 136 in a manner similar to that shown in FIG. 1.

It should be appreciated that the external electrodes 134 and 136 could be placed in either wafer portion 102 or 104 and that the second wafer portion not located between the electrodes could be made up of a passive dielectric or another electro-optic material, so long as $\Delta n_{12}=|\Delta n_1-\Delta n_2|=0$ when no field is applied. If a similar electro-optic material is used for the second wafer portion, it should be oppositely oriented to the first wafer portion so that the electric fields fringing into the second wafer portion do not lower the asymmetry, but work to increase it. With wafers so aligned the electrodes 134 and 136 could also extend below the plane of the waveguide strip into region 102 for a larger effect.

The applied electric field and changes in index of refraction are approximately found by:

$$E = -\frac{1}{d}(V_B + V_{RF}\sin(\omega t))$$

$$\Delta n_1 = -\frac{1}{2}n^3 r \cdot E$$

$$\Delta n_2 = 0$$

In this case (FIG. 10) the total asymmetry in index of refraction is contained within the electro-optic material in wafer portion 104.

Again using an index of refraction asymmetry of $\Delta n_{12}=2\times10^{-4}$ for cutoff to occur, the necessary electric field applied for the case of, say, DKDP with n=1.4834, r=25.5 pm/V is $E_{cutoff}=4.8$ V/$\mu$m. From this the required voltage is $V_T=V_{RF}+V_B$, so $V_T(d)=d*E_{cutoff}$. For a few representative cases, $V_T$ values are:

$V_T(10~\mu m)=48$ V $V_T(15~\mu m)=72$ V

The voltage required in this case is higher than previous cases since the external electrodes 134 and 136 must still be placed a similar distance away from the waveguide strip 106, but only one half of the device is actively contributing to the total asymmetry seen by the plasmon-polariton mode. As well, the nominal index of refraction for DKDP is lower than that of LiNbO$_3$. Again, the bias voltage will be at least half of this value and the high frequency voltage will thus vary the total voltage between 0 volts and $V_T$. A modulator constructed from an Au waveguide in DKDP should then be operational with $V_B$=24V and $V_{RF}$=24V.

In this embodiment the chirp can be designed either positive or negative depending on whether the index of refraction in the active region is increased or decreased.

Modulators constructed using DKDP and similar materials having an index of refraction of approximately n=1.5 will operate with metallic strip widths between w=0.5 $\mu$m and 8 $\mu$m and thickness between t=5 nm and t=50 nm. Modulators will perform better though with narrower thinner strips with width in the range w=0.7 $\mu$m to w=6 $\mu$m and thickness between t=15 nm and t=25 nm. In particular a metallic strip in said material with width w=4 $\mu$m and thickness t=20 nm will have a modal attenuation of about 1 dB/cm.

This embodiment would also work for other linear and quadratic electro-optic materials such as LiNbO$_3$ and PLZT, but is not the optimal geometry for these particular materials.

General

The modulation devices described herein are predicated upon the fact that an asymmetry induced in optical waveguiding structures comprising a thin narrow metallic strip as a guiding element may inhibit propagation of the main long-ranging purely bound plasmon-polariton wave supported. In the embodiments described herein, the asymmetry in the waveguide structure is induced in distinct dielectric portions above and below the metallic strip. The distinct dielectric portions comprise electro-optic material and the asymmetry in the waveguide structure is induced by electro-optically changing the refractive index of one distinct portion relative to the other.

The plasmon-polariton wave is akin to a surface wave and thus is very sensitive to the refractive index of the material in the immediate vicinity of the metallic strip. For thinner and narrower metallic strips, this sensitivity is increased.

The modulation devices make use of an external electrical stimulus to induce or enhance the asymmetry in the dielectrics of the structure, via electro-optically induced changes in refractive index. It should be appreciated that, under no applied electric field, the substantially matched refractive indices of the cladding materials allow the plasmon-polariton wave to propagate unimpeded. As the refractive indices vary one relative to the other, radiation begins to occur and the insertion loss of the modulator begins to increase. This trend continues until the waveguide is cut-off, at which point the purely bound long-ranging plasmon-polariton wave is not supported.

Generally, a plasmon-polariton waveguide having a metallic strip of large aspect ratio supports substantially TM polarized light, ie.: the transverse electric field component of the optical mode is aligned substantially along the normal to the largest dimension in the waveguide cross-section, and as such requires an asymmetry in the index of refraction along this direction. This can be achieved using one or both of the two common electro-optic effects, the Pockels effect and the Kerr effect, depending on the particular embodiment and electro-optic materials selected.

Figure 13:
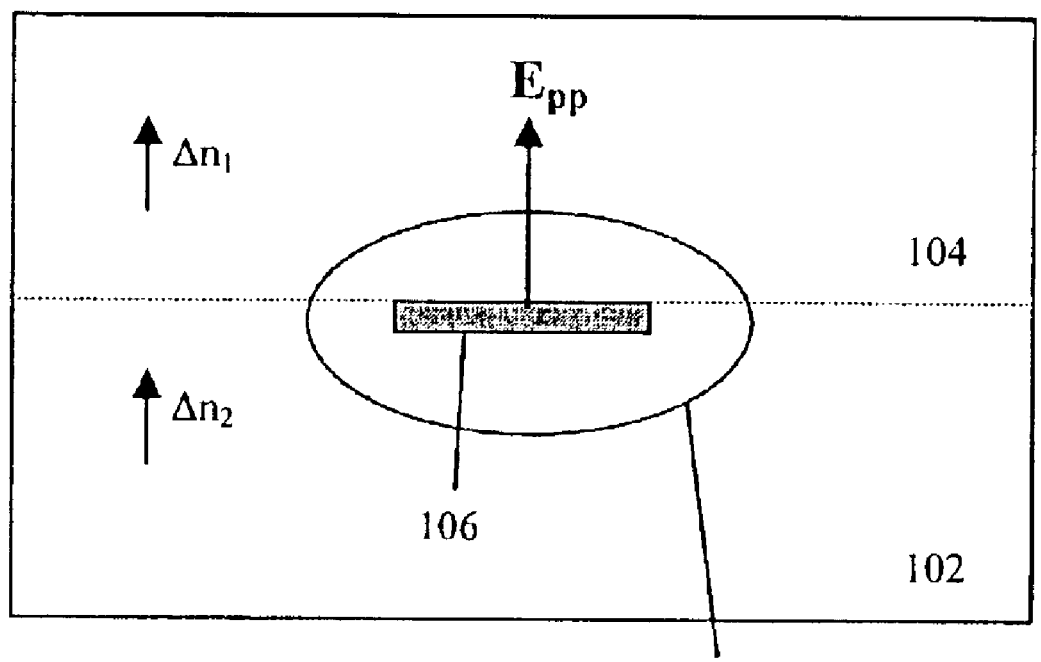
FIG. 13 illustrates the relative orientations of the index changes and the electric field associated with the plasmon-polariton wave.

Guidelines for the selection of the materials, the orientation of the materials relative to the strip, the orientation of the applied electric field relative to the strip, and the location of the electrode means relative to the strip are given as follows, with reference to FIG. 13:

for a metallic strip having a width greater than its thickness,
  the strongest electric field component of the plasmon-polariton wave, $E_{pp}$, is directed along the perpendicular to the strip width,
  thus the largest available index change in portions 102 and/or 104 should occur substantially parallel with this direction,
  the electrode means are disposed such that the applied electric field is oriented in the direction that requires the least electric field strength to effect the refractive index change,
  the distance between the electrode means and the metallic strip should be small,
  the distance between the electrode means should be small,
  the applied electric field should overlap well with a large portion of the plasmon-polariton wave (the mode size of the plasmon-polariton wave can be in the range between w=5 µm and w=40 µm).

Applying such guidelines ensures that the drive voltage is low. Electrode means are not shown in FIG. 13, but should be placed within or outside of this structure, as described in the foregoing description of the preferred embodiments.

It should be understood that, in each of the embodiments, other material orientations may still allow the modulator means to function, but may require an increase in the applied voltage. This increase can be three to four times greater, or more, depending on the particular material and its associated electro-optic coefficients.

In the embodiments described herein, the low insertion loss or "on" state is achieved when no drive voltage is applied to the modulator, and the high insertion loss or "off" state is achieved when the drive voltage is applied to the modulator. It should be appreciated that any embodiment could operate in the converse manner by applying a DC bias voltage to either or both of the distinct portions; i.e: the low insertion loss or "on" state is achieved when drive voltage is applied to the modulator, and the high insertion loss or "off" state is achieved when no drive voltage is applied to the modulator.

Wavelengths and Interface Means

The modulator will operate with radiation:

having a wavelength such that a plasmon-polariton wave is supported,;

at optical wavelengths;

at optical communications wavelengths;

at wavelengths in the range of 800 nm to 2 µm;

at wavelengths near 1550 nm;

at wavelengths near 1310 nm;

at wavelengths near 850 nm,;

at wavelengths near 980 nm.

It should be appreciated that references to wavelength should be interpreted as meaning the centre wavelength of the spectrum associated with the input radiation.

Unlike a Mach-Zehnder modulator, modulation means embodying the present invention are not based on interferometry and so do not require coherent input radiation for operation. The plasmon-polariton wave will be cutoff whether the radiation is coherent or incoherent; hence the modulator operates with laser or LED input radiation.

The plasmon-polariton wave which propagates along the structure maybe excited by an appropriate optical field incident at one of the ends of the waveguide, as in an end-fire configuration, and/or by different radiation coupling means. This incident optical field can be in the optical communications wavelength range such that a plasmon-polariton wave is excited for the particular modulator geometry. The modulator is broadband and can operate over the optical C and L bands with little or no bias voltage tuning required.

Dimensions

The modulators will have good "on" state performance if the metallic strip has a width in the range from about 8 µm to about 0.15 µm and a thickness in the range from about 100 nm to about 5 nm, particular dimensions depending on the index of refraction of the surrounding material and the wavelengths For metallic strips bounded by distinct portions comprising materials such as lithium niobate and PLZT, having a refractive index in the range from about 2 to about 2.5, as discussed in three of the embodiments, the range of dimensions for the metallic strip is the width in the range from about 3 µm to about 0.15 µm and the thickness in the range from about 50 nm to about 5 nm. Such waveguide structures support propagation of a plasmon-polariton wave having a wavelength in the range from about 0.8 µm to 2 µm. Good dimensions for the metallic strip are a width in the range from about 1.2 µm to about 0.7 µm and thickness in the range from about 25 nm to about 15 nm. A good choice for the dimensions of the metallic strip are a width of about 1 µm and a thickness of about 20 nm for operation in the wavelength range from about 1.3 µm to 1.7 µm. The wavelength selected is preferably a wavelength used for optical communications. Other materials having an index of refraction approximately in the same range require strip dimensions in approximately the same ranges.

For metallic strips bounded by distinct portions comprising materials such as DKDP, having a refractive index in the range from about 1.4 to about 1.8, as discussed in one of the embodiments, the range of dimensions for the metallic strip is the width in the range from about 8 µm to about 0.5 µm and the thickness in the range from about 50 nm to about 5 nm. Such waveguide structures support propagation of a plasmon-polariton wave having a wavelength in the range from about 0.8 µm to 2 µm. Good dimensions for the metallic strip are a width in the range from about 6 µm to about 0.7 µm and thickness in the range from about 25 nm to about 15 nm. A good choice for the dimensions of the metallic strip are a width of about 4 µm and the thickness of about 20 nm for operation in the wavelength range from about 1.3 µm to 1.7 µm. The wavelength selected is preferably a wavelength used for optical communications. Other materials having an index of refraction approximately in the same range require strip dimensions in approximately the same ranges.

The width of the external electrodes (or in the case of the fourth embodiment, the height or thickness) should be such that it spans the mode size of the plasmon-polariton wave. The mode size can be in the range between w=5 µm and w=40 µm. For typical modes described in this invention an electrode width in the range from about 40 µm to about 1 µm, especially from about 30 µm to about 10 µm, and preferably about 20 µm are good widths.

The low voltage operation of the embodiments is made possible by the close proximity of the electrode means to each other and/or to the metallic strip. Electrodes can be brought into close proximity to the metallic strip by as much as 2 µm to 3 µm by using ITO layers between the electrode and the distinct portions. A good distance of the electrode means from the metallic strip is in the range from about 20 µm to about 5 µm, depending on the materials selected and wavelength of operation.

For example, where the optical radiation has a free-space wavelength of 1550 nm, and the metallic strip is constructed from gold and is surrounded by an appropriate electro-optic material such as lithium niobate, with suitably placed electrodes, and the metallic strip has dimensions of about 1 µm wide and 20 nm thick and a length of the order of a couple of millimeters a suitable difference between the refractive index of the two distinct portions to induce mode cutoff and radiation is about $2.7 \times 10^{-4}$.

Construction

The distinct electro-optic portions of the device, above or below the metallic strip, may comprise single crystal or partially crystalline material, and may consist of different types of electro-optic material which are not necessarily homogeneous. The electro-optic material may be only on the top or only on the bottom of the metallic strip with an appropriately matched passive dielectric constituting the opposite cladding region. These variations lead to alternate embodiments. All embodiments will have the same or similar on-state optical characteristics and vary mainly in ease of fabrication and magnitude of applied voltage necessary for modulation.

Devices are fabricated using wafer bonding and polishing or known deposition techniques for the cladding materials, and known lithographic and metal deposition techniques for the metallic strip. The metallic strip may be embedded in a shallow trench etched within one of both of the portions 102 or 104, or surrounded by a planarizing dielectric layer having a refractive index that matches that of the claddings when no field is applied.

The metallic strip may consist of, but is not limited to consisting of, a single metal or a combination of metals from the group Au, Ag, Cu, Al, Pt, Pd, Ti, Ni, Mo, and Cr, preferred metals being Au, Ag, Cu, and Al. A single material or combination of materials which behave like metals, such as Indium Tin Oxide can also be used. The metallic strip is not necessarily homogeneous.

The external drive electrodes can be constructed from any good conductor, but should consist of one of the less lossy metals Au, Ag, Cu, and Al if the proximity of the electrodes to the plasmon-polariton wave guided by the metallic strip is such that slight optical coupling occurs between the strip and the electrodes.

The modulator could be straight, curved, bent, tapered, and so on. Tapered input and output metallic strip sections may be necessary depending on the mode size so that coupling loss to the input and output means is minimized.

The modulation means can comprise: a metallic strip that is homogeneous and either or both distinct portions that are homogeneous, a metallic strip that is homogeneous and either or both distinct portions that are inhomogeneous, a metallic strip that is inhomogeneous and either or both distinct portions that are homogeneous, a metallic strip that is inhomogeneous and either or both distinct portions that are inhomogeneous. An inhomogeneous metallic strip can be formed from a continuously variable material composition, or strips or laminae. An inhomogeneous distinct portion can be formed from a continuously variable material composition, or strips or laminae.

Miscellaneous

The short length of the modulator allows it to be driven as a lumped element by an appropriate high-frequency voltage circuit. For example, a 2 mm long modulator in LiNbO3 ($\epsilon_r=28$) with top and bottom electrodes (as described in the first embodiment) of width 10 $\mu$m separated from each other by 10 $\mu$m has a capacitance of: $C=\epsilon_0*\epsilon_r*A/d=(8.854\times10^{-12})*28*(10\times10^{-6})*(2\times10^{-3})/10\times10^{-6}=0.5$ pF. A capacitance of 0.5 pF can be driven to frequencies beyond 10 GHz within a lumped element circuit.

The metallic strip is made of conductive material and as such may be used as an electrode to bias or drive the modulator. The term "external electrode" refers to other optically non-invasive electrode elements outside of the waveguide region. The metallic strip used to form the waveguide may also be used as part of a control circuit to monitor temperature and voltage within the modulator in locations where it is not being used as a biasing or drive electrode. Short gaps of up to a few microns in the metallic strip can be introduced to electrically isolate parts of the strip without deleteriously affecting the propagation of the plasmon-polariton wave.

The present invention embraces not only linear amplitude optical modulators, but also variable optical attenuators and on/off switches; i.e., in this specification, the term "modulation means" embraces variable attenuators, linear modulators, digital modulators, on/off modulators and on/off switches. The latter cases simply mean that the insertion loss of the modulator varies from very low in the on state, to very high in the off state.

It is envisaged that the metallic strip 106 in any of the above-described embodiments could be replaced by a strip having width and thickness of substantially the same order as described in U.S. published patent application No.20030059147 A1.

Industrial Applicability

An advantage of modulators embodying the present invention is that they can be readily connected to a polarized light source, for example by way of a polarization-maintaining fiber, or directly to another plasmon-polariton device, such as the external cavity laser disclosed in the above-mentioned U.S. Provisional patent application. Such a modulator-ECL combination could be readily provided on the same substrate and interconnected by a common waveguide metallic strip.

In contrast to modulators which are based upon voltage induced waveguiding, mode overlap changes, or mode extinction, as discussed above, embodiments of the present invention depend upon sensitivity to the electromagnetic properties of the material above and below the waveguiding strip. This effect is unique to the surface wave nature of the plasmon-polariton waveguide. The metallic strip in embodiments of the present invention remains unchanged during the modulation cycle and, beyond cut-off, light is preferentially radiated into the high index region above or below the waveguide strip.

Although embodiments of the invention have been described and illustrated in detail, it is to be clearly understood that the same is by way of illustration and example only and not to be taken by way of the limitation, the spirit and scope of the present invention being limited only by the appended claims.

| Acronyms and chemical formulae used in this specification | | |
|---|---|---|
| KTP | KTiOPO$_4$ | Potassium Titanyl Phosphate |
| DKDP | KD$_2$PO$_4$ | Deuterated Potassium Dihydrogen Phosphate |
| KDP | KH$_2$PO$_4$ | Potassium Dihydrogen Phosphate |
| ADP | (NH$_4$)H$_2$PO$_4$ | Ammonium Dihydrogen Phosphate |
| AD*P | (NH$_4$)D$_2$PO$_4$ | Deuterated Ammonium Dihydrogen Phosphate |
| PLZT | (Pb$_{1-x}$La$_x$), (Zr$_y$Ti$_{1-y}$)O$_3$ | Lead Lanthanum Zirconium Titanate |
| PZT | (Pb), (Zr$_y$Ti$_{1-y}$)O$_3$ | Lead Zirconium Titanate |
| ITO | In$_2$O$_3$:SnO$_2$ | Indium Tin Oxide |
| BaTiO$_3$ | | Barium Titanate |
| As$_2$S$_3$ | | Arsenic Sulphide |
| As$_2$Se$_3$ | | Arsenic (III) Selenide |
| SPP | Surface Plasmon Polariton | |
| ATR | Attenuated Total Reflection | |
| DC | Direct Current | |
| RF | Radio Frequency or High Frequency | |
| TM | Transverse Magnetic | |
| TE | Transverse Electric | |
| $\mu$m | micron | |
| mm | millimeter (except in crystal symmetry groups) | |
| nm | nanometer | |

What is claimed is:

1. Modulation means comprising input means (107), output means (109) and a waveguide structure therebetween:

the waveguide structure formed by a thin metallic strip (106) surrounded by material having a relatively low free charge carrier density, the surrounding material comprising first (102) and second (104) distinct portions with the metallic strip extending at an interface between respective juxtaposed surfaces (102", 104") of the first and second distinct portions, the metallic strip having finite width and thickness, the width being greater than the thickness, dimensioned such that optical radiation emitted by the input means having a wavelength in a predetermined range couples to the metallic strip and, when said first and second distinct portions are substantially index-matched, propagates along the length of the metallic strip as a plasmon-polariton wave with its transverse electric field substantially perpendicular to the width of the metallic strip;

the input means being arranged to couple said optical radiation to one end of the metallic strip so as to excite said plasmon-polariton wave and said output means being coupled to the opposite end of the metallic strip so as to receive the plasmon-polariton wave;

at least the first distinct portion (102) comprising an electro-optic material having a preferred axis along which its refractive index changes in response to an applied electric field;

electrode means (100) extending adjacent, preferably substantially longitudinally parallel to, the metallic strip, at least part of the first distinct portion extending between said electrode means and said metallic strip;

and control means (112) for applying a voltage ($V_T$) to the electrode means so as to establish an electric field (E) in said first distinct portion, the orientation of said preferred axis of the electro-optic material relative to said metallic strip, and the positioning of the electrode means relative to said metallic strip both being such that variation of said refractive index is in a direction that extends transversely of, and preferably is substantially perpendicular to, said width of the metallic strip;

said control means (112) being operable to modulate said voltage so as to vary said refractive index of said first distinct portion relative to that of said second distinct portion, such that a plasmon-polariton wave propagating along the metallic strip will be correspondingly modulated.

2. Modulation means according to claim 1, wherein the electrode means comprises first (100) and second (108) electrodes disposed at opposite sides, respectively, of the metallic strip (106), and spaced apart in said perpendicular direction, said first distinct portion (102) being between the first electrode (100) and the metallic strip (106) and the second distinct portion (104) being between the second electrode (108) and the metallic strip (106), said second distinct portion (104) also comprising electro-optic material having a preferred axis along which its refractive index changes in response to an applied electric field, the respective preferred axes of the first and second distinct portions both extending substantially parallel to said perpendicular direction but oriented in opposite directions, and wherein the control means (112) applies said voltage between the first and second electrodes so an to establish said electric field (E) in the same direction in both first and second distinct portions.

3. Modulation means according to claim 1, wherein the electrode means comprises first (100) and second (108) electrodes disposed at opposite sides, respectively, of the metallic strip (106), and spaced apart in said perpendicular direction, said first distinct portion (102) being between the first electrode (100) and the metallic strip (106) and the second distinct portion (104) being between the second electrode (108) and the metallic strip (106), said second distinct portion (104) also comprising an electro-optic material having a preferred axis along which its refractive index changes in response to an applied electric field, the respective preferred axes of the first and second distinct portions both extending substantially parallel to said perpendicular direction and both oriented in the same direction, the control means (112) being connected to the first and second electrodes (100, 108) and to the metallic strip (106) and applying first ($V_A$) and second ($V_B$) voltages to the first (100) and second (108) electrodes respectively, relative to the metallic strip (106), so as to establish first ($E_A$) and second ($E_B$) electric fields in the first and second distinct portions respectively, the first and second electric fields being in opposite directions, and wherein the control means (112) modulates both applied voltages ($V_A, V_B$).

4. Modulation means according to claim 3, wherein the control means comprises a first voltage source for applying a first potential difference between the metallic strip and the first electrode and a second voltage source for applying a second potential difference between the metallic strip and the second electrode.

5. Modulation means according to any one of claims 1 to 4, wherein the electro-optic material of the first distinct portion (102) comprises a crystalline material selected from the symmetry groups 2 mm, 3, 3 m, 4, 4 mm, 6, 6 mm.

6. Modulation means according to any one of claims 1 to 4, wherein the electro-optic material of the second distinct portion (104) comprises a crystalline material selected from the symmetry groups 2 mm, 3, 3 m, 4, 4 mm, 6, 6 mm.

7. Modulation means according to claim 1, wherein the electrode means comprises an electrode (100) spaced apart from said metallic strip (106) in said perpendicular direction and the control means (112) applies said voltage ($V_T$) between the metallic strip (106) and the electrode (100) and wherein said preferred axis extends parallel to said perpendicular direction.

8. Modulation means according to claim 7, wherein the electro-optic material of the first distinct portion (102) comprises a crystalline material selected from the symmetry groups 2 mm, 3, 3 m, 4, 4 mm, 6, 6 mm.

9. Modulation means according to claim 5, wherein the crystalline material comprises z-cut lithium niobate, its z-axis being the preferred axis.

10. Modulation means according to claim 1, wherein the first distinct portion (102) is oriented with said preferred axis transversely to said metallic strip (106), preferably extending substantially parallel to the width of the metallic strip (106), the electrode means comprises first and second electrodes (134,136) disposed at opposite sides, respectively, of the metallic strip (106) and spaced apart along said preferred axis with said first distinct portion (102) therebetween, and the control means (112) applies said voltage between the first and second electrodes (134,136) such that the direction of the electric field (E) in the first distinct portion (102) is parallel to said preferred axis.

11. Modulation means according to claim 10, wherein the electro-optic material of the first distinct portion (102) comprises a crystalline material selected from the symmetry group overbar {4} 2 m.

12. Modulation means according to claim 11, wherein the crystalline material comprises DKDP with its z-axis being the preferred axis.

13. Modulation means according to claim 7 or 10, wherein the electro-optic material of the first distinct portion (102) comprises a cubic crystalline material having 3 axes along which its refractive index will change to a greater extent than in other directions, one of said three axes being preselected as said preferred axis.

14. Modulation means according to claim 13, wherein the cubic crystalline material comprises an aggregate of similarly oriented single crystal domains.

15. Modulation means according to claim 13, wherein the cubic crystalline material comprises a single crystal.

16. Modulation means according to claim 7 or 10, wherein the electro-optic material of the first distinct portion (102) comprises PLZTx 65/35 with x variable in the range from about 8 to about 10, having 3 axes along which its refractive index will change to a greater extent than in other directions, one of said three axes being preselected as said preferred axis.

17. Modulation means according to claim 1, wherein a channel is provided in one of said juxtaposed surfaces at the two distinct portions and the metallic strip is accommodated at least partially in the channel.

18. Modulation means according to claim 1, wherein a layer of dielectric material index-matched to the two distinct portions when they are index-matched is provided between the juxtaposed surfaces of the two distinct portions and the metallic strip extends in a channel in said layer.

19. Modulation means according to claim 1, wherein the metallic strip has a width in the range from about 8 μm to about 0.15 μm and a thickness in the range from about 100 nm to about 5 nm.

20. Modulation means according to claim 19, wherein the first distinct portion comprises electro-optic material having a refractive index of about 2 to 2.5, and the metallic strip has a width in the range from about 3 μm to about 0.15 μm and a thickness in the range of about 50 nm to about 5 nm, said waveguide structure supporting propagation of a plasmon-polariton wave having a wavelength in the range from about 0.8 μm to 2 μm, preferably a wavelength used for optical communications.

21. Modulation means according to claim 20, wherein the metallic strip has a width in the range from about 1.2 μm to about 0.7 μm and thickness in the range from about 25 nm to about 15 nm.

22. Modulation means according to claim 21, wherein the width in about 1 μm and the thickness is about 20 nm, said waveguide structure supporting propagation of a plasmon-polariton wave having a wavelength in the range from about 1.3 μm to 1.7 μm, preferably a wavelength used for optical communications.

23. Modulation means according to claim 19, wherein the first distinct portion comprises electro-optic material having a refractive index of about 1.4 to 1.8 and the metallic strip has a width in the range from about 8 μm to about 0.5 μm and a thickness in the range of about 50 nm to about 5 nm, said waveguide structure supporting propagation of a plasmon-polariton wave having a wavelength in the range from about 0.8 μm to 2 μm, preferably a wavelength used for optical communications.

24. Modulation means according to claim 23, wherein the metallic strip has a width in the range from about 6 μm to about 0.7 μm and thickness in the range from about 25 nm to about 15 nm.

25. Modulation means according to claim 24, wherein the width is about 4 μm and the thickness is about 20 nm, said waveguide structure supporting propagation of a plasmon-polariton wave having a wavelength in the range from about 1.3 μm to 1.7 μm, preferably a wavelength used for optical communications.

26. Modulation means according to claim 2, 3 or 10, wherein said second electrode (108) has a width in the range from about 40 μm to about 1 μm, especially from about 30 μm to about 10 μm and preferably is about 20 μm.

27. Modulation means according to claim 26, wherein the distance of the second electrode (108) from the metallic strip (106) is in the range from about 20 μm to about 5 μm.

28. Modulation means according to claim 1, wherein the metallic strip has width and thickness of the same order.

29. Modulation means according to claim 28, wherein the metallic strip is substantially square in cross-section.

30. Modulation means according to any one of claims 1 to 4, 7 to 12, 17 to 25, 28 and 29, wherein the control means supplies said modulation signal sufficient to modulate the plasmon-polariton wave substantially to extinction.

31. Modulation means according to claim 5, wherein the electro-optic material of the second distinct portion (104) comprises a crystalline material selected from the symmetry groups 2 mm, 3, 3 m, 4, 4 mm, 6, 6 mm.

32. Modulation means according to claim 6, wherein the crystalline material comprises z-cut lithium niobate, its z-axis being the preferred axis.

33. Modulation means according to claim 8, wherein the crystalline material comprises z-cut lithium niobate, its z-axis being the preferred axis.

34. Modulation means according to claim 5, wherein the control means supplies said modulation signal sufficient to modulate the plasmon-polariton wave substantially to extinction.

35. Modulation means according to claim 6, wherein the control means supplies said modulation signal sufficient to modulate the plasmon-polariton wave substantially to extinction.

36. Modulation means according to claim 13, wherein the control means supplies said modulation signal sufficient to modulate the plasmon-polariton wave substantially to extinction.

37. Modulation means according to claim 14, wherein the control means supplies said modulation signal sufficient to modulate the plasmon-polariton wave substantially to extinction.

38. Modulation means according to claim 15, wherein the control means supplies said modulation signal sufficient to modulate the plasmon-polariton wave substantially to extinction.

39. Modulation means according to claim 16, wherein the control means supplies said modulation signal sufficient to modulate the plasmon-polariton wave substantially to extinction.

40. Modulation means according to claim 26, wherein the control means supplies said modulation signal sufficient to modulate the plasmon-polariton wave substantially to extinction.

41. Modulation means according to claim 27, wherein the control means supplies said modulation signal sufficient to modulate the plasmon-polariton wave substantially to extinction.

* * * * *